United States Patent [19]

Harris

[11] 4,068,856
[45] Jan. 17, 1978

[54] SAFETY SPARE TIRE LOCKING BOLT

[76] Inventor: Herbert Harris, 1828 - 4th St., Washington, D.C. 20001

[21] Appl. No.: 667,616

[22] Filed: Aug. 8, 1967

[51] Int. Cl.$^2$ .............................................. B62D 43/00
[52] U.S. Cl. ............................... 280/179 R; 224/42.24
[58] Field of Search ................... 180/68.5; 280/179 R; 224/42.12, 42.13, 42.24; 70/259, 260

[56] References Cited

U.S. PATENT DOCUMENTS

| 849,023 | 4/1907 | Sargent | 280/179 |
|---|---|---|---|
| 1,495,442 | 5/1924 | Rosencrans | 280/179 |
| 1,616,155 | 2/1927 | Uebelmesser | 224/42.13 X |
| 1,739,354 | 12/1929 | Evans et al. | 280/179 |
| 1,759,212 | 5/1930 | Wasserfallen | 224/42.24 |
| 3,226,133 | 12/1965 | Geresy | 280/507 |
| 3,715,066 | 2/1973 | Owen | 224/42.24 |
| 3,979,035 | 9/1976 | Huot | 224/42.13 X |

*Primary Examiner*—Joseph F. Peters, Jr.
*Assistant Examiner*—Terrance L. Siemens

[57] ABSTRACT

A spare tire locking device to secure a spare tire wheel to the floor or sides of the trunk of an automobile. The hooked portion of a long J-shaped shaft is passed under a bracket in the trunk with the straight portion passing through and extending beyond the standard bolt holes in the wheel. That portion of the shaft which extends immediately beyond the wheel has a section of larger diameter with a crosshole suitable for the passage of an ordinary padlock shackle. The padlock is protected and concealed from view by a large washer and nut at the shaft end.

1 Claim, 3 Drawing Figures

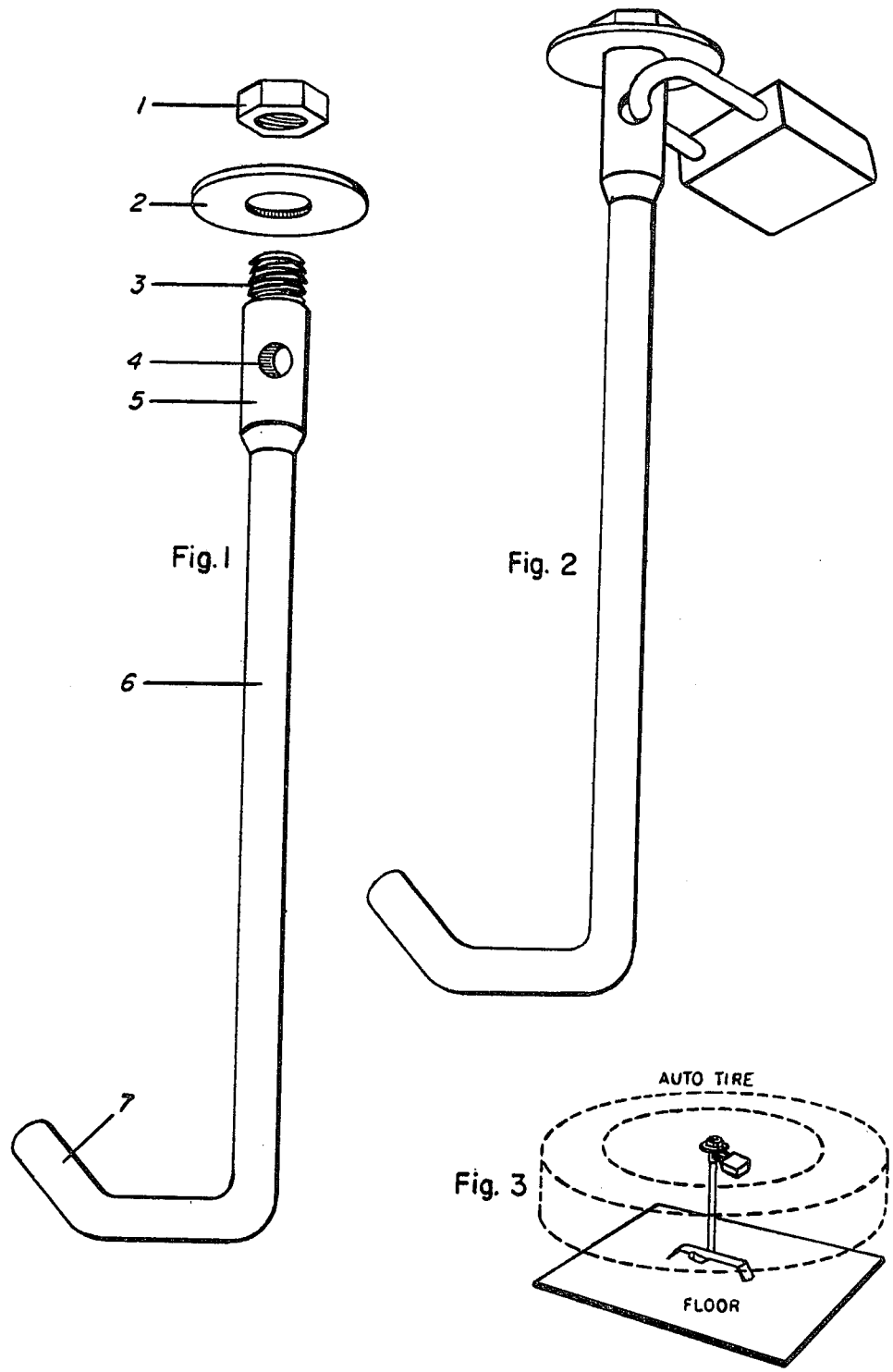

SAFETY SPARE TIRE LOCKING BOLT

BACKGROUND OF THE INVENTION

This invention relates to the field of clamping or holding devices for the spare tire of an automobile. In particular it relates to such a holding device which may be readily locked so as to prevent the theft of the spare tire. Although the prior art teaches the use of lockable spare tire holders, the prior devices tend to be bulky and expensive to produce. None of the prior devices provide a means of concealing the lock after it has been used to secure the tire.

SUMMARY OF THE INVENTION

The invention provides an inexpensive but reliable means of holding a spare tire in the trunk of an automobile while preventing its removal by anyone but the authorized owner. The padlock holding the tire will not be visible to the thief until after he has removed the concealing nut and washer. Having thus wasted time and effort and increased his chances of apprehension the thief will tend to be deterred from further attempting to remove the tire as by breaking the lock.

It is an object of this invention to provide a simple but reliable means of first hindering and ultimately preventing the removal of a spare tire by theft.

Another object is to provide such a theft preventing means as will also serve as an adequate clamping means for holding a spare tire to the floor or the sides of an automobile trunk.

A further object is to provide a lock of superior strength by thickening those portions of the clamping means which are exposed to access by the potential thief.

Another object is to provide a spare tire lock which will be both protected and concealed from view by simple but effective means.

These and futher objects will be apparent to those skilled in the art in the light of the accompanying drawings and detailed description of a preferred embodiment. It is to be understood that these drawings are for the purpose of illustration only and that the invention is not limited thereto.

BRIEF DESCRIPTION OF THE DRAWINGS

FIG. 1 is an exploded view of the parts of the spare tire lock with the padlock removed.

FIG. 2 is a view of the assembled portions of the spare tire lock with the padlock in place.

FIG. 3 shows the relationship of the spare tire lock to the spare tire and the floor.

DESCRIPTION OF THE PREFERRED EMBODIMENT

Referring to FIG. 1, a J-shaped bolt is shown as comprising; a hooked or curved portion 7, a straight intermediate portion 6, a thick portion 5, a crosshole 4, and a threaded end portion 3. Shown in position for assembly on the threaded end are washer 2 and nut 1. The diameter of the thick portion 5 is small enough to pass through the standard wheel bolt holes of an automotive spare tire but large enough to provide improved strength. Crosshole 4 is drilled perpendicular to the axis of the straight portion of the bolt through the thick portion 5. The purpose of this crosshole is to receive the shackle of an ordinary padlock as shown in FIG. 2. When the washer and nut are assembled on the threaded end of the bolt they serve the dual function of concealing the lock from view and protecting the lock from damage by other articles being carried in the automobile trunk.

FIG. 3 shows the entire device in its locked condition securing a tire to a floor section. The curved portion of the locking bolt fits under a bracket which is fastened to the floor. The straight portion is then passed up through a bolt hole in the spare tire wheel. In this position crosshole 4 will be slightly above the wheel allowing the insertion of the padlock. Washer 2 and nut 1 are then attached to the upper end of the locking bolt. It will be recognized that the device itself will not hold the wheel extremely tight against its supporting surface because such dimensioning would interfere with the insertion of the padlock. However, if it is desired to hold the wheel tightly it may be done with many simple expedients. For example, the insertion of a wedge shaped object between the tire and the support surface would accomplish the desired result.

Various changes and modifications may be made within this invention as will be readily apparent to those skilled in the art. Such changes and modifications are within the scope and teaching of this invention as defined by the following claim.

I claim:

1. A spare tire holding and locking device comprising; a padlock having a shackle, a shaft bent at its lower end to hook under a bracket on a flat interior surface of an automobile trunk, said shaft having a straight portion for extending through a bolt hole in a spare tire wheel when the tire is flat against said surface, said straight portion including an upper portion of increased diameter which has a crosshold formed therethrough removably receiving the padlock shackle, said upper portion being threaded at its end for receiving a washer and threaded nut for the purpose of protecting and concealing the padlock.

* * * * *